United States Patent
Kato et al.

(10) Patent No.: US 6,697,105 B1
(45) Date of Patent: *Feb. 24, 2004

(54) CAMERA CONTROL SYSTEM AND METHOD

(75) Inventors: Eiji Kato, Yokohama (JP); Tomoaki Kawai, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 297 days.

(21) Appl. No.: 08/837,802

(22) Filed: Apr. 22, 1997

(30) Foreign Application Priority Data

Apr. 24, 1996 (JP) .............................................. 8-102492

(51) Int. Cl.⁷ ................................................ H04N 5/232
(52) U.S. Cl. ............................... 348/211.6; 348/211.11; 348/211.13; 348/211.99
(58) Field of Search ................................. 348/153, 154, 348/159, 15, 211, 213, 13, 211.99, 211.1–211.9, 211.11–211.14, 14.05, 14.08, 14.09, 143

(56) References Cited

U.S. PATENT DOCUMENTS

| 4,992,866 | A | * | 2/1991 | Morgan | 348/15 |
| 5,446,491 | A | * | 8/1995 | Shibata et al. | 348/15 |
| 5,625,410 | A | * | 4/1997 | Washino et al. | 348/154 |
| 5,657,246 | A | * | 8/1997 | Hogan et al. | 348/13 |
| 5,745,161 | A | * | 4/1998 | Ito | 348/15 |
| 5,757,418 | A | * | 5/1998 | Inagaki | 348/15 |

* cited by examiner

Primary Examiner—Wendy R. Garber
Assistant Examiner—Luong Nguyen
(74) Attorney, Agent, or Firm—Morgan & Finnegan, L.L.P.

(57) ABSTRACT

A camera control system for selecting one camera from among a plurality of controllable cameras connected in a network and for making it possible to display video from the camera and to control the camera is adapted to display a map. One or more camera symbols representing cameras are displayed on the map and the user designates a desired camera symbol to control the camera corresponding to the symbol designated. It is also possible for the user to change the display magnification of the map displayed.

20 Claims, 17 Drawing Sheets

FIG.5

| CAMERA NO. | POSITION(x, y) | DEPLOYMENT ORIENTATION |
|---|---|---|
| 1 | (100, 200) | 25 |
| 2 | (57, 30) | 75 |
| 3 | (24, 130) | 135 |
| ⋮ | ⋮ | ⋮ |

FIG. 7

| CAMERA NO. | APPARATUS ADDRESS | MAP NAME | POSITION(x, y) | DEPLOYMENT ORIENTATION |
|---|---|---|---|---|
| 1 | 150.61.31.1 | OfficeA | (100, 200) | 25 |
| 2 | 150.61.31.1 | OfficeA | (57, 30) | 75 |
| 3 | 150.61.31.1 | OfficeA | (24, 130) | 135 |
| 4 | 150.61.31.2 | OfficeB | (100, 250) | 25 |
| 5 | 150.61.31.2 | OfficeB | (100, 270) | 245 |
| 6 | 150.61.31.3 | OfficeC | (300, 400) | 220 |
| 7 | 150.61.31.3 | OfficeC | (340, 450) | 210 |
| ----- | ----- | ----- | ----- | ----- |

----- CENTER LINE

FIG. 13
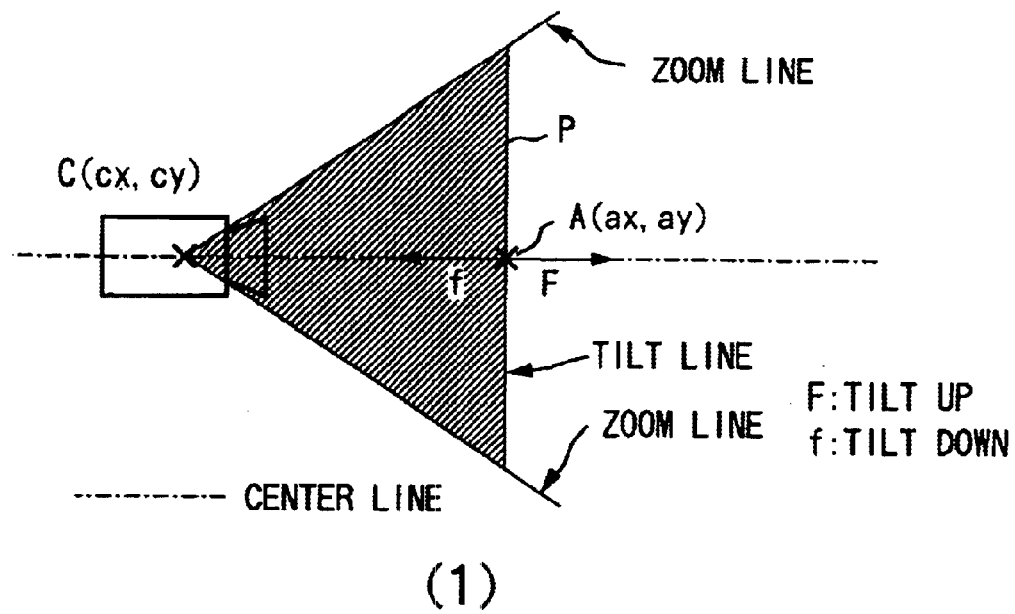
(1)
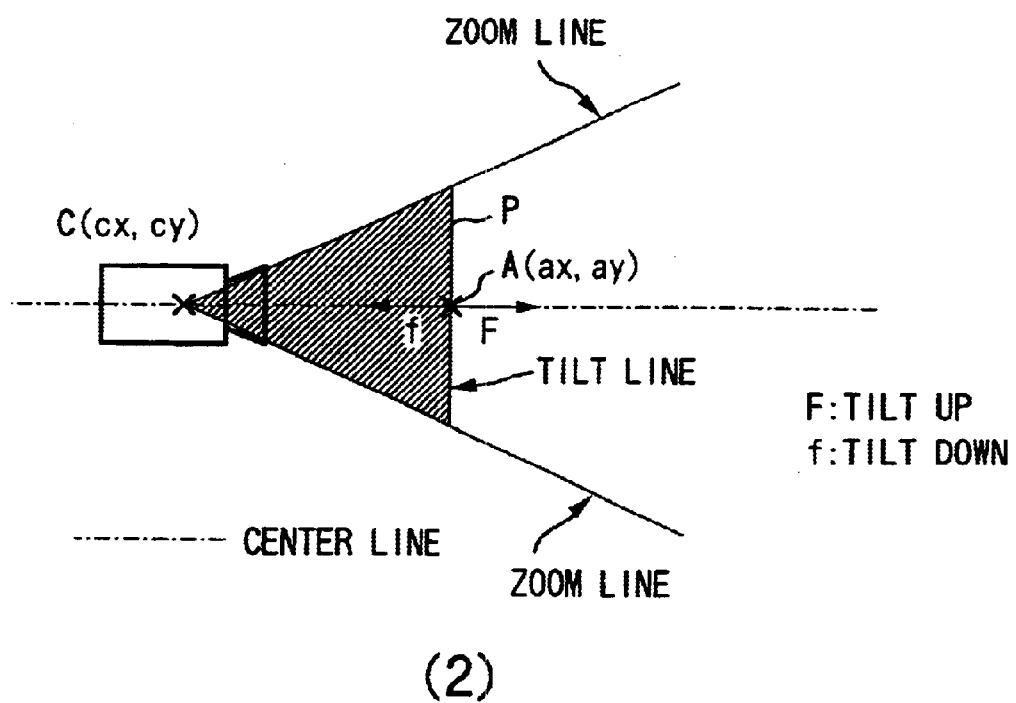
(2)

CAMERA CONTROL SYSTEM AND METHOD

BACKGROUND OF THE INVENTION

This invention relates to a camera control system and method, more particularly, to a camera control system and method capable of controlling one or more video cameras connected to a network.

In a typical video camera system for monitoring purposes or the like, the system includes a plurality of video cameras capable of being externally controlled so as to be panned, tilted and zoomed. In a situation in which a plurality of such cameras are remotely controlled by a single control unit, one video camera that is to be controlled is selected by its identifying number or name and, while viewing the video that enters from the selected video camera, the operator manipulates up, down, left and right buttons and a slider on a control panel of the kind shown in FIG. 16 to control panning, tilting and zooming of the video camera.

There are instances where it is difficult for the operator to know exactly which camera is to be controlled based solely upon the name of the camera and the video received from it. In other words, it is difficult for the operator to ascertain, merely by looking at the video, the relationship between the video and the position and orientation of the camera.

SUMMARY OF THE INVENTION

Accordingly, an object of the present invention is to provide a camera control system which solves the problem described above.

According to the present invention, the foregoing object is attained by providing a camera control system for selecting one camera from among a plurality of controllable cameras connected in a network and making it possible to display video and to control the camera, comprising map display means for displaying a map, symbol display means for displaying one or more camera symbols, which represent the cameras, on the map displayed by the display means, control means for designating a camera symbol, whereby the camera corresponding to the designated camera symbol is rendered controllable, and display magnification changing means for changing display magnification of the displayed map.

In the arrangement described above, the control means selects a function of a controllable camera in conformity with the display magnification determined by the display magnification changing means. When the display magnification determined by the display magnification changing means is less than a predetermined magnification, the control means makes possible solely a display of an image entered by the camera without controlling panning, tilting or zooming, etc. In a preferred embodiment, the predetermined magnification is made 25%.

In the arrangement described above, the display magnification changing means has a plurality of display magnifications and is capable of selecting one of these magnifications. Furthermore, in a preferred embodiment, the display magnifications of the display magnification changing means are 100%, 75%, 50% and 25%. The display magnification changing means has a pull-down menu indicating the plurality of display magnifications.

When a display magnification determined by the display magnification changing means exceeds the predetermined magnification in the arrangement described above, the control means makes it possible to control at least one of a panning operation and zooming operation of a selected camera. In a preferred embodiment, the predetermined magnification is made 25%.

In the arrangement described above, the display magnification changing means is capable of setting display magnification in variable fashion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 shows an example of camera position information;

FIG. 7 shows an example of camera position information for supporting a network;

FIG. 13 is a diagram useful in describing an operation for changing tilt angle;

DESCRIPTION OF THE PREFERRED EMBODIMENTS

Embodiments of the present invention will now be described with reference to the drawings.

Figure 1:
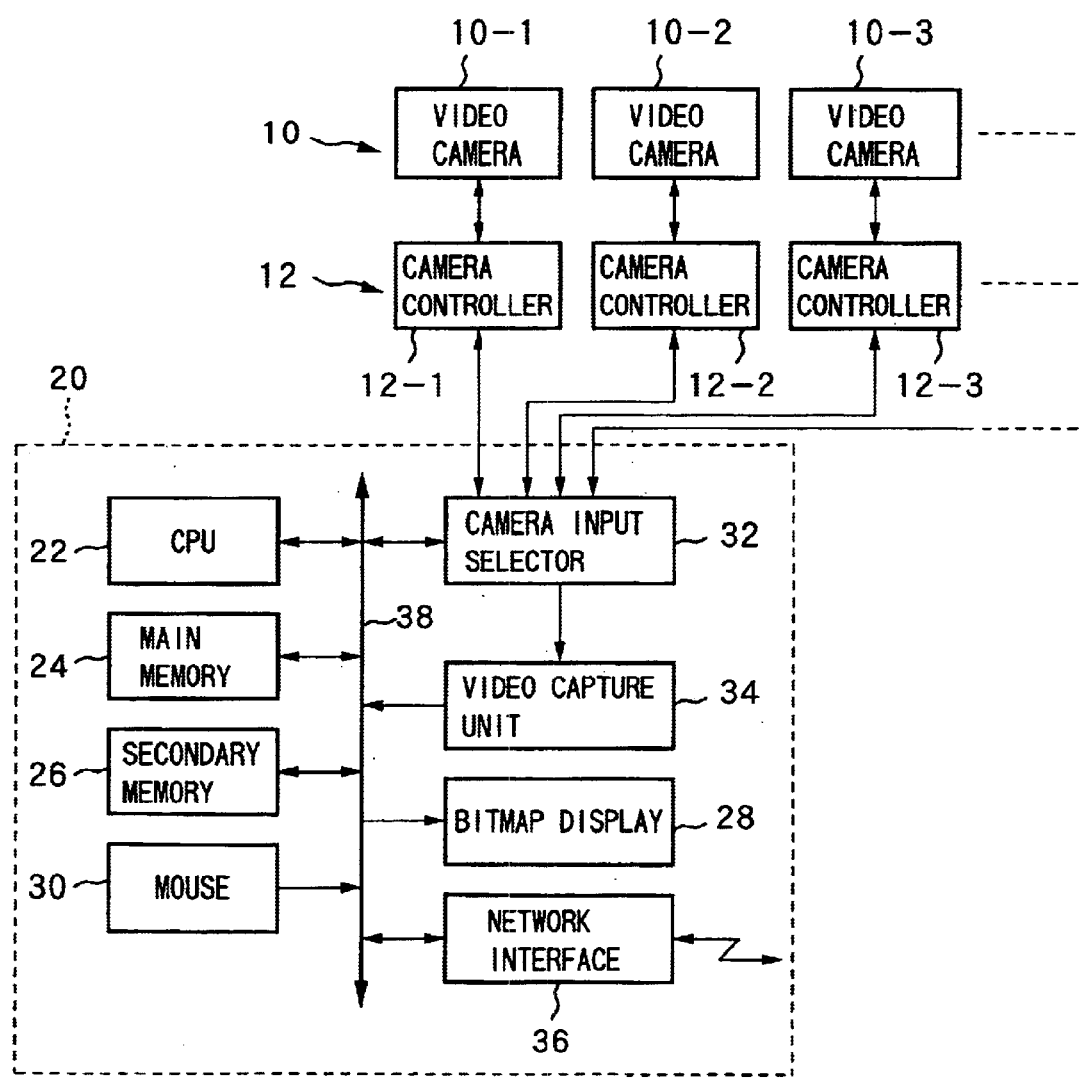
FIG. 1 is a block diagram illustrating the configuration of a system, embodying the present invention.

FIG. 1 is a block diagram illustrating the configuration of a system embodying the present invention. The system includes a plurality of video cameras 10-1, 10-2, 10-3, . . .

and camera controllers 12-1, 12-2, 12-3, . . . for directly controlling panning, tilting, zooming, focusing and lens opening of the video cameras 10-1, 10-2, 10-3, . . . , respectively, in accordance with externally applied control signals. An RS-232C or the like is used as the control signal line, though it is obvious that this does not impose a limitation upon the invention.

The system further includes a camera control apparatus comprising a computer for controlling each of the video cameras 10-1, 10-2, 10-3, . . . by sending them control commands (which correspond to the externally applied control signals mentioned above). The camera control apparatus 20 includes a CPU 22 for overall control, a main memory 24, a secondary memory 26 (a hard disk, for example), a bitmap display 28 and a mouse 30 serving as a pointing device. The apparatus further includes a camera input selector 32 for selecting one of the video cameras 10-1, 10-2, 10-3, . . . as a camera to be controlled, and for placing the selected video camera under the control of the control apparatus, a video capture unit 34 for capturing an output video signal from the video camera selected by the camera input selector 32, a network interface 36 for connecting the camera control apparatus 20 to a computer network or communication line network, and a system bus 38 for interconnecting each of the devices 22 through 36. Owing to this arrangement, if an apparatus X (not shown) having components similar to the camera controlling apparatus 20 is connected to the network, the apparatus 20 can operate as a client of the apparatus X by sending a camera control signal to the apparatus X via the network interface 36 and can control a camera of the apparatus X. That is, the apparatus 20 can operate as a server and a client.

The camera input selector 32 selects one control signal line and one video output from one selected camera controller among the plurality of camera controllers 12-1, 12-2, 12-3, . . . , supplies the video output from the selected camera to the video capture unit 34 and logically connects the selected control signal line to the bus 38. An example of the format of the video signal is an NTSC signal of luminance/color-difference type. The video capture unit 34 captures the video output selected by the camera input selector 32. The captured video signal is displayed as a moving picture in a prescribed window of the bitmap display 28.

Figure 2:
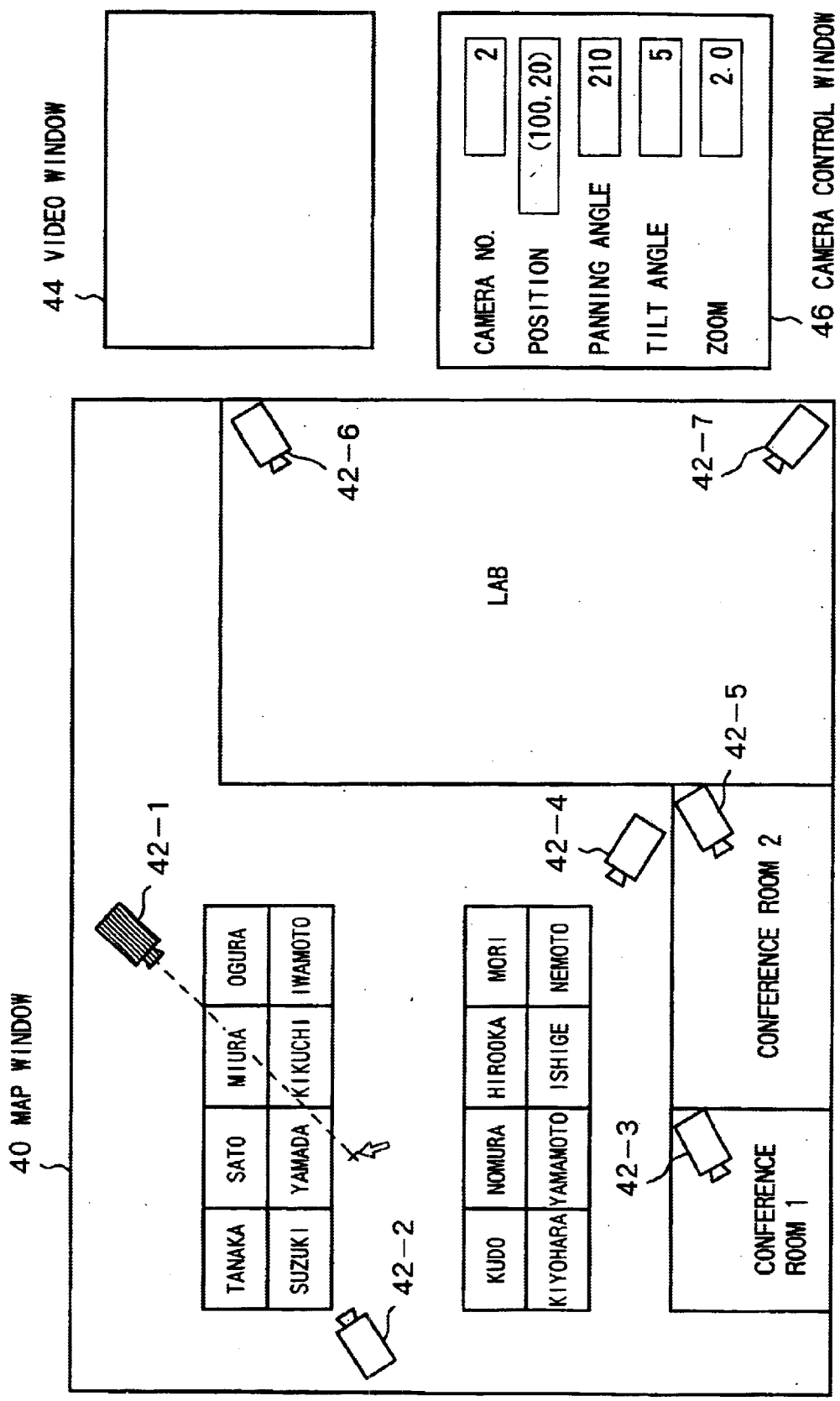
FIG. 2 illustrates an example of a display screen according to this embodiment.

The secondary memory 26 stores map data which indicate the array of the cameras 10-1, 10-2, 10-3, . . . , camera position information which indicates the positions of the cameras 10-1, 10-2, 10-3, . . . , and camera icon data which specify each of the cameras 10-1, 10-2, 10-3, FIG. 2 shows an example of a display screen presented by the bitmap display 28. It is assumed here that a windows display system capable of displaying a plurality of windows on the bitmap display 28 simultaneously is operating. A map display window 40 displays a map such as the seating arrangement of an office, as well as camera icons 42-1~42-7, which appear on the map, indicating the locations at which the plurality of cameras 10-1, 10-2, 10-3, . . . are located in the office. The camera icons 42-1~42-7 are displayed in orientations approximately the same as the orientations of the corresponding cameras 10-1, 10-2, 10-3, . . . . Output video from the single camera selected by the camera input selector 32 is displayed in a video window 44. The camera icon corresponding to the selected camera in the map window 40 is displayed in a color different from the camera icons corresponding to the unselected cameras in order to distinguish the selected camera from the other cameras. In the case of FIG. 2, the camera corresponding to the camera icon 42-1 is shown as being selected. Though the details will be described later, the camera icon 42-1 indicates the operating state of a Mode #1.

The number (ID or name), position, panning angle, tilt angle and zoom magnification of the camera being controlled are displayed in a camera control window 46. The position field in the camera control window 46 displays the position of the camera corresponding to the input in the camera number field. Fields other than the position field are for data input and control can be performed by entering numerical values in these fields. However, as will be described later, control can be carried out by manipulating the camera icons directly.

It is assumed in this embodiment that each of the cameras 10-1, 10-2, 10-3, . . . is capable of being controlled in four aspects, namely panning, tilt, zoom and focal point. In this embodiment, three modes are provided, namely:

Mode #1: change panning and focal point

Mode #2: change panning and zoom

Mode #3: change panning and tilt

Though the details will be described later, the three modes mentioned above are selected cyclically when the camera icon of a selected camera is double-clicked using the mouse 30.

Figure 10:
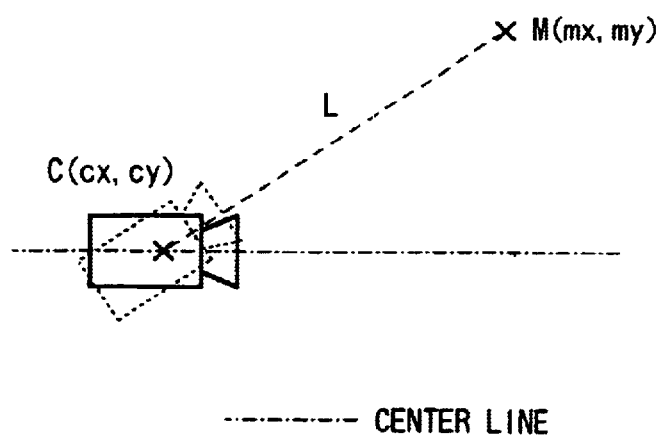
FIG. 10 is a diagram useful in describing an operation for changing panning angle and focal point.

As shown in FIG. 10, let a point C (cx,cy) represent the position (the center) of the selected camera icon, and let a point M (mx,my) represent the position of the mouse cursor. The direction of the vector C→M is defined as the horizontal (panning) direction of the camera. It should be noted that the orientation of the camera is taken as the direction in which the center of the lens is pointed and is represented by a horizontal angle (panning direction) and vertical angle (tilt direction).

Further, the sign of the mouse cursor position relative to the camera icon is defined. Specifically, let L represent the distance between the points C and M, and let the direction in which the camera icon is pointing on the map [the front side of the camera icon (an area in which x>0 holds, where the panning direction of the camera is the positive direction along the x axis and the axis perpendicular to this direction is the y axis)] be the positive direction. Let the converse (the rear side of the camera icon, namely the area in which x<0 holds) be the negative direction. Then, operation is stipulated as follows in conformity with the mouse cursor position M:

Mode #1: change the position of M to the focal point (focusing)

Mode #2: change the zoom magnification to "L×constant"

Mode #3: change the tilt angle to the "L×constant×sign of mouse cursor position relative to camera icon"

By making use of the above-mentioned parameters thus stipulated by the points C and M, the selected camera is actually controlled by the mouse and camera icon. Furthermore, the panning angle covers an angular range of −90° to +90°, with 0° being the center. The tilt angle is 0° when the camera is oriented horizontally, takes on positive and negative angles when the camera is tilted up and down, respectively, from the horizontal, and the tilt angle covers an angular range of −70° to +70°. If operation is performed in Mode #3, the angle of tilt is changed by tilting the camera upward when the point M is in front of the camera and downward when the point M is in back of the camera.

The color of the selected camera is changed depending upon the mode in order that the operator may readily ascertain which of the three modes has been selected. More specifically, the selected camera is displayed in the color green for Mode #1, blue for Mode #2 and yellow for Mode #3.

In this embodiment, tilt (θ), pan (φ), zoom (z) and focus (I) are camera operating instructions, where θ represents the panning angle, φ the tilt angle, z the zoom magnification and I the focal point. Further, "change (n)" is an instruction for switching over the camera to be controlled, where n represents the camera number. The CPU 22 supplies these instructions to the camera input selector 32 as necessary, whereupon the camera input selector 32 supplies one camera, which has been selected earlier or immediately previously by the instruction "change (n)", with the above-mentioned control instructions (relating to panning, tilting, zooming and focusing) from the CPU 24. The camera input selector 32 transfers the output video from the selected camera to the video capture unit 34.

Figure 3:
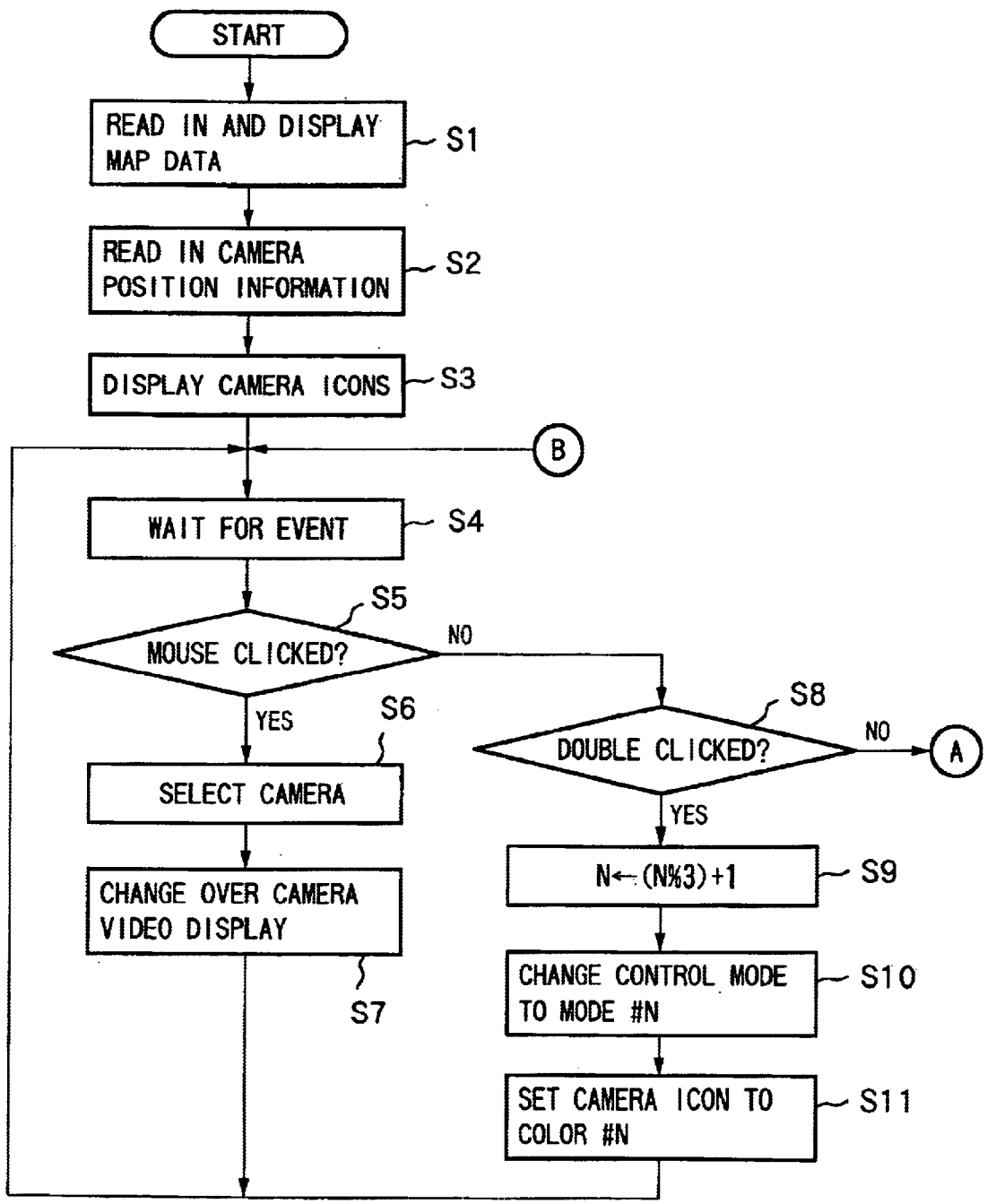
FIG. 3 is part of an operation flowchart according to this embodiment.
Figure 4:
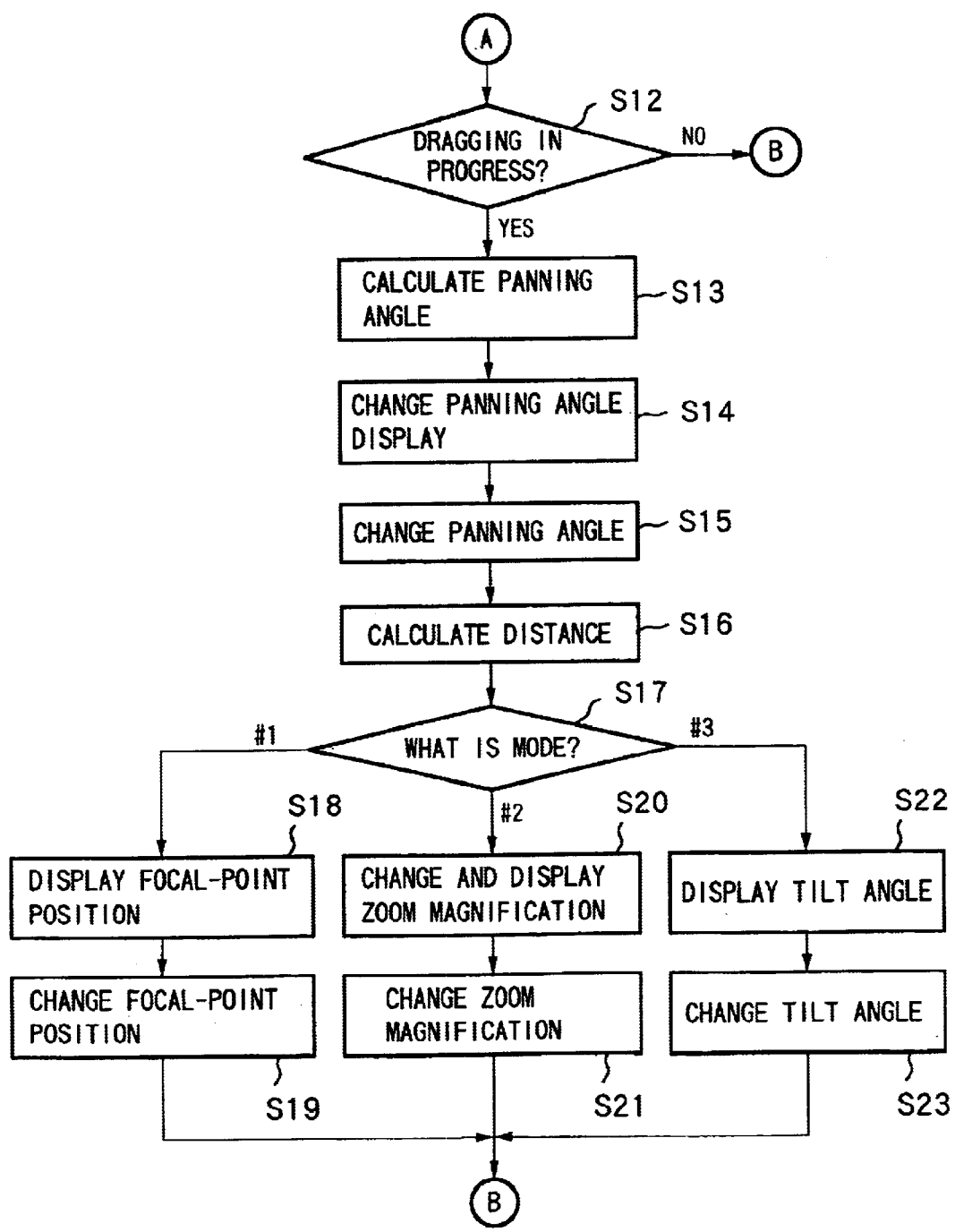
FIG. 4 is part of an operation flowchart according to this embodiment.

The overall flowchart of this embodiment is shown in FIGS. 3 and 4. The operation of this embodiment will now be described with reference to FIGS. 3 and 4.

First, the map data that have been stored in the secondary memory 26 as a file or the like are read in and displayed as a bitmap of a seating arrangement (step S1) in the manner exemplified in the map window 40 (FIG. 2). Next, a file (camera position information file) having position information representing the positions of the cameras actually deployed is read in from the secondary memory 26 or, as will be described later, from a network (step S2). On the basis of each item of position information, the camera icons 42-1~42-7 are displayed at the corresponding positions in the map window 40 and each camera is initialized (step S3). Stored in this position information file in relation to all deployed cameras are camera number, camera position coordinates and camera deployment orientation (camera orientation when the camera panning angle is set at 0°), as illustrated in FIG. 5. In this embodiment, it is assumed that all cameras are initially set at a tilt angle of 0°, a focal point of infinity and a zoom magnification of 1.0 at start-up time. Accordingly, the panning angle, tilt angle, zoom magnification and focal length for each camera are unnecessary, as shown in FIG. 5.

Next, the system waits (S4) for the user to operate the mouse. If any one of the camera icons 42-1~42-7 has been selected ("YES" at S5) by clicking on the icon using the mouse, then the color of the camera icon so designated is changed (S6) to a color (red in this example) which indicates that the camera icon has been selected, the camera number corresponding to the camera position is obtained from the position information file (it is assumed here that the selected camera number is "n"), and the camera changeover instruction "change (n)" is sent to the camera input selector 32. As a result, the camera to be controlled is changed to camera #n and the output video from camera #n is displayed in the video window 44 (S7).

If, after a camera has been selected, the user double clicks on the selected camera icon by using the mouse ("YES" at S8), then the mode is changed over. More specifically, whenever the selected camera icon is double clicked, the mode is changed over in cyclic fashion, i.e. #1→#2→#3→#1→#2→#3. The color of the selected camera icon also is changed over at such time in dependence upon the particular mode (step S9~S11). That is, the color changes to green when Mode #1 is selected, to blue when Mode #2 is selected and to yellow when Mode #3 is selected. It should be noted that X%Y at step S9 indicates the remainder when X is divided by Y.

Similarly, if, after a camera has been selected, the user clicks and drags the mouse (i.e. moves the mouse while pressing the mouse button) ("YES" at step S12) in a prescribed manner, processing conforming to the currently prevailing mode is executed. More specifically, let the point C (cx, cy) represent the position of the selected camera icon (which position corresponds to the center of movement of the pan head), and let M (mx,my) represent the position of the mouse cursor 30 during the dragging operation (see FIG. 10).

First, the panning angle is calculated (S13). The angle θ (in radians) of the vector C→M is θ=arctan [(my-cy)/(mx-cx)] when mx>cx holds, and θ=arctan [(my-cy)/(mx-cx)]+π when mx<cx holds. Accordingly, the value (represented by $θ_1$) obtained by subtracting θ from the camera deployment orientation shown in FIG. 5 is the panning angle. Since the range of the panning angle is -90° to +90° in this embodiment, the value of the upper limit or lower limit, namely +90° or -90°, is set in a case where the calculated angle falls outside of this range.

The orientation of the camera icon is displayed upon being changed in dependence upon the panning angle (S14), an instruction "pan ($θ_1$)" for changing the camera angle is sent to the camera input selector 32 and the camera under control is panned in the instructed direction through the angle $θ_1$ (S1).

Next, the distance L between the points C and M is calculated (S16) and processing for each mode is executed, in the manner described below, in conformity with the distance L (steps S17~S23).

More specifically, when Mode #1 is in effect (S17), the distance L is adopted as the new camera focal point p, a symbol indicating that this is the focal point is displayed at the point M (S18) and an instruction "focus (p)" for changing the camera focal point is applied to the camera input selector 32 (S19).

When Mode #2 is in effect (S17), the zoom magnification is determined from the distance L and displayed (S20) on the map in the form of a character string and/or numerical values, and an instruction "zoom (z)" for changing the zoom magnification is applied to the camera input selector 32 (step S21). It should be noted that z is set to a value obtained by multiplying L by a certain constant.

When Mode #3 is in effect (S17), the camera tilt angle φ is determined from the distance L and displayed (S22) on the map in the form of a character string and/or numerical values, and an instruction "tilt (φ)" for changing the tilt angle is applied to the camera input selector 32 (step S23). It should be noted that φ is arctan [L×constant×(sign of the mouse cursor position relative to the camera icon)].

Each of the parameters calculated at steps S18, S20 and S22 is forcibly adjusted to fall within a set range even in a case where the result of calculation exceeds the range capable of being set.

When the processing of steps S5~S23 ends, the program returns to step S4, where the system waits for the next event.

In this embodiment, one video camera of one or a plurality of video cameras arranged on the map displayed on the display screen is selected. As a result, the corresponding relationship between the actual position and orientation of the camera and the video from the camera can be ascertained with ease. In addition, a plurality of cameras actually deployed in an office can be remotely controlled via a user interface that is easy to comprehend.

Figure 6:
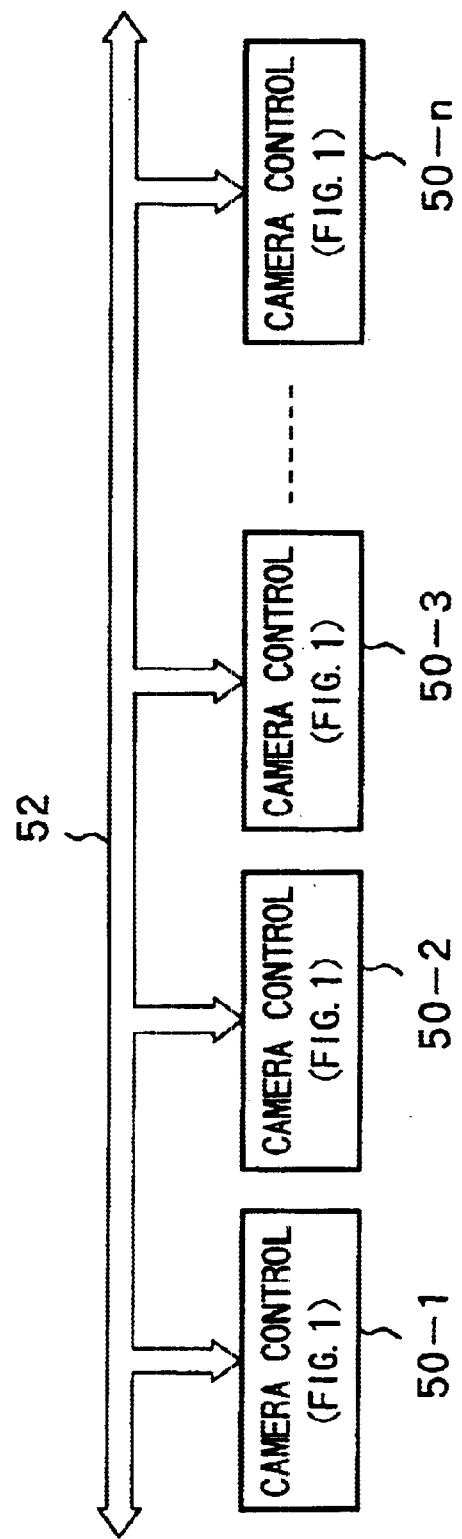
FIG. 6 shows an example of a configuration for supporting a network.

The embodiment illustrated in FIG. 1 can be expanded to support a network. For example, as shown in FIG. 6, a plurality of camera control apparatuses 50-1~50-n having the same construction as the apparatus of FIG. 1 are connected to a network 52. The network 52 is presumed to be a local area network (LAN) or wide area network (WAN)

having a bandwidth large enough to transmit digital moving pictures captured by the video capture unit 34 and camera control signals. However, this does not impose a limitation upon the invention.

Each of the camera control apparatuses 50-1~50-n is capable of outputting video data, which have been captured by the video capture unit 34, to the network 52 in packet form and of receiving video data from the network 52 in packet form. The bitmap display 28 displays video data, which have been captured by the video capture unit 34, and video data from the network in the video window. Each of the camera control apparatuses 50-1~50-n is capable of transmitting instructions to and receiving instructions from the network 52, the instructions being the instructions "tilt ($\theta$)", "pan ($\phi$)", "zoom (z)" and "focus (I)" for controlling the cameras and the instruction "change (n)" for changing over cameras. The camera control instructions and camera changeover instruction received from the network 52 are handled in the same manner as the camera control instructions and camera changeover instruction generated internally.

In order to support a network, the camera position information is additionally provided with an apparatus address item and a map name (i.e. office name) item, as shown in FIG. 7. At camera selection it is necessary to select the apparatus address and/or map name from a menu to change over the cameracontrol apparatus and/or map. The usefulness of the map name item is not limited to network support. This item is effective also in cases where cameras are placed at widely separated locations and cannot all be expressed on a single map. In other words, this item makes it possible to change over among a plurality of maps and display the desired map in the map window 40.

When a camera to be controlled has been selected and its camera number is known, reference is had to the table shown in FIG. 7 to obtain the apparatus address from the camera number. In a case where the selected camera cannot be controlled directly, i.e. in a case where the selected camera is controlled via the network, the camera control instructions and camera changeover instruction are issued via the network to the apparatus having the pertinent camera. With regard to the display of camera video, let A represent a camera control apparatus (the client) which displays a map and enters the camera control instructions, and let B represent a camera control apparatus to which the selected camera is connected. It is so arranged that when the camera has been selected, apparatus A requests apparatus B to transmit camera video, in response to which apparatus B transmits its captured video data to apparatus A via the network.

By thus expanding the system to accommodate a network, more cameras can be controlled even in cases where there is a limitation upon the number of inputs to the camera input selector. Further, in a case where it is desired to control one or a plurality of cameras placed as separated locations, control can be performed in mutual fashion and bidirectionally in a simple manner.

If each individual camera control apparatus is so adapted as to possess map information representing the office spaces managed by the other camera control apparatuses, it will be necessary to update the map information of all of the camera control apparatuses when, say, a new office is added on and is provided with cameras. Such an updating operation is a major undertaking. Accordingly, the following arrangement is advantageous: Specifically, it is so arranged that map information and position information representing the positions of cameras on a map is furnished to the camera control apparatus to which the cameras on the map are directly connected. Then, when the network is connected so that camera control apparatus A may control a certain camera under the control of the camera control apparatus B, by way of example, the camera control apparatus A sends the camera control apparatus B a request to transfer the map information and camera position information. Upon receiving the request, the camera control apparatus B transfers its own map information and camera position information to the camera control apparatus A. The camera control apparatus A displays the map window 40 of FIG. 2 based upon the map information and camera position information it has received.

Second Embodiment

Figure 8:
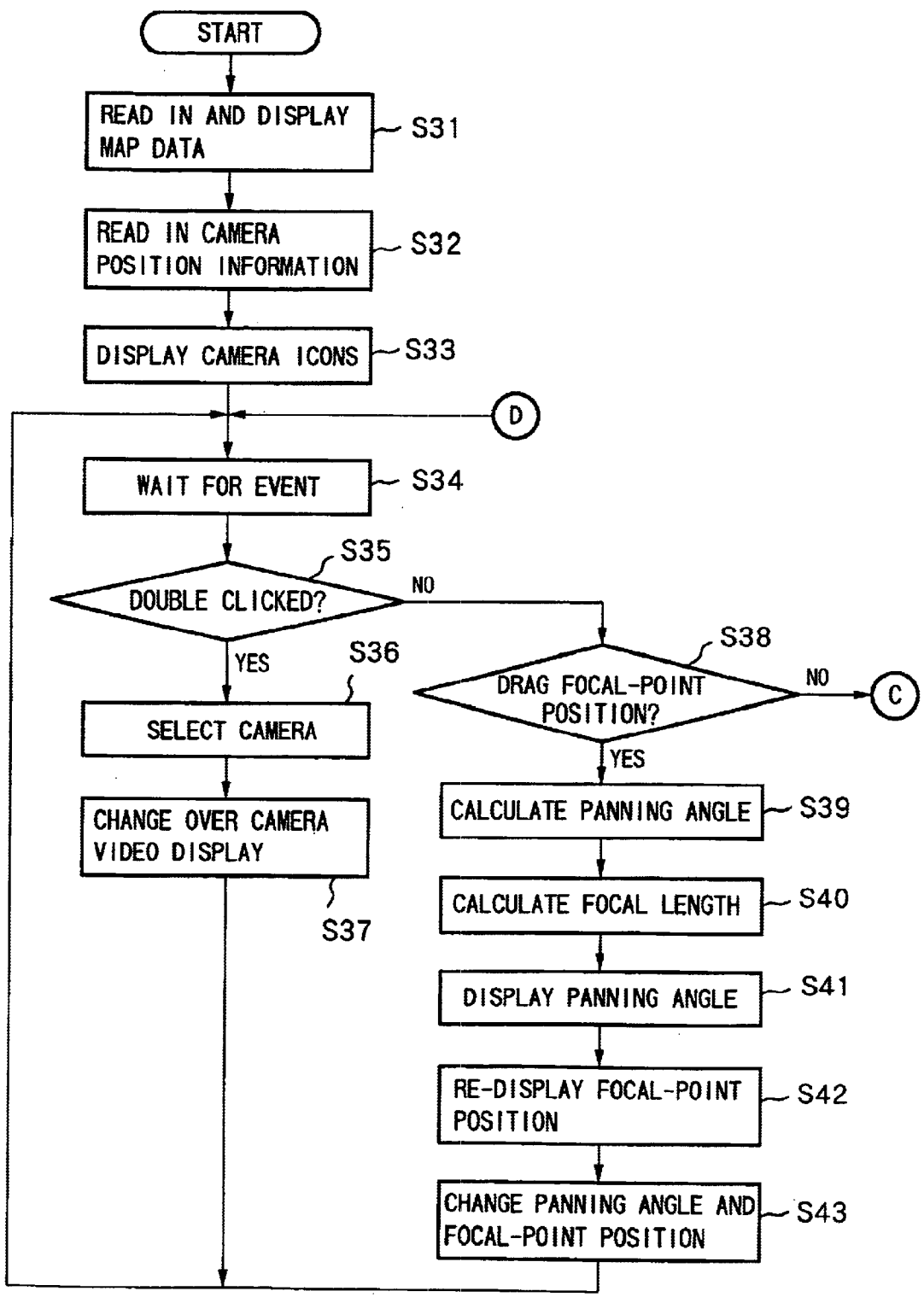
FIG. 8 is part of another operation flowchart.
Figure 9:
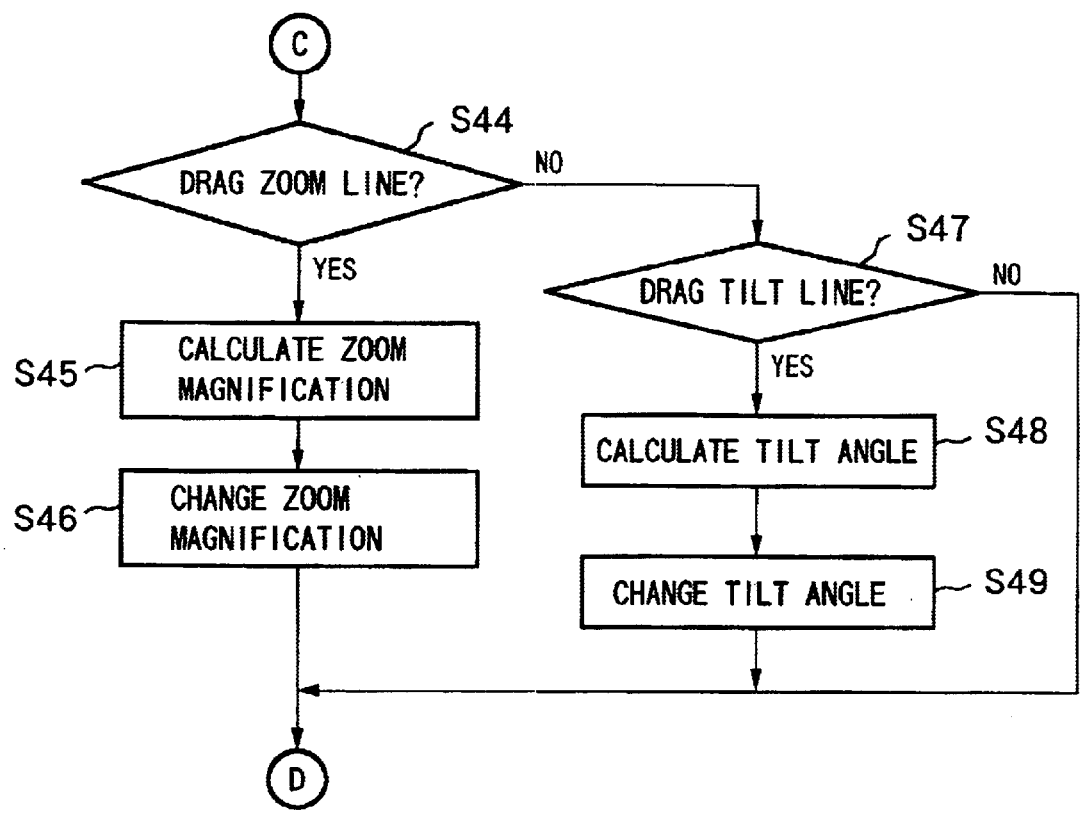
FIG. 9 is part of another operation flowchart.

An example of an improvement, in terms of operability, on the embodiment shown in FIG. 1 will now be described as a second embodiment of the invention. Here camera control based upon a graphical user interface is realized in the map window 40. FIGS. 8 and 9 illustrate the overall operation flowchart regarding operations performed by the operator.

In the example described below, the camera control apparatus 20 controls the cameras connected to it. However, it goes without saying that the camera control apparatus 20 may control cameras connected to other control apparatuses in the network. In the latter case, it would suffice to receive (at steps S31 and S32) the pertinent information from the control apparatus located at the connection to the network.

First, the map data that have been stored in the secondary memory 26 are read in and displayed as a bitmap of a seating arrangement (step S31) in the manner exemplified in the map window 40. Next, a camera position information file is read in (step S32). On the basis of each item of position information, the camera icons 42-1~42-7 are displayed at the corresponding positions in the map window 40 (step S33).

Next, the system waits (S34) for the user to operate the mouse. If any of the camera icons 42-1~42-7 has been selected by being doubled clicked using the mouse 30 ("YES" at step S35), the display of the camera icon that has been double clicked is changed to a display indicating that the icon has been selected (S36). The camera number corresponding to the camera position is obtained from the position information file (it is assumed here that the camera number is "n") and the camera changeover instruction change (n) is sent to the camera input selector 32. As a result, the camera to be controlled is changed to camera #n and the output video from camera #n is displayed in the video window 44 (S37).

Figure 17:
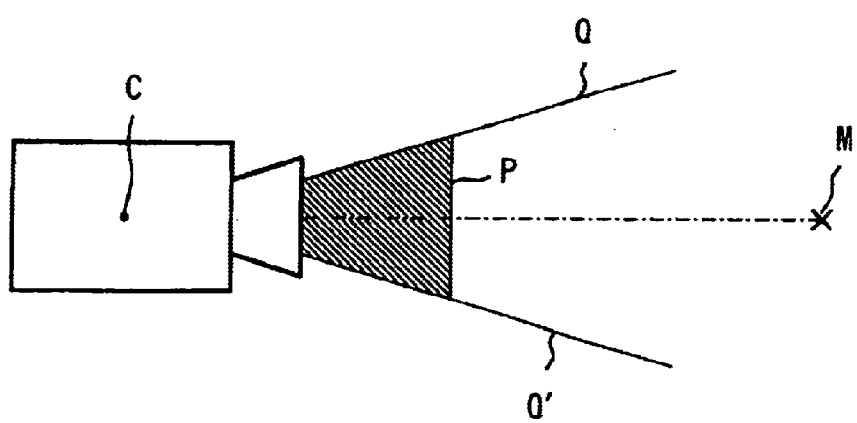
FIG. 17 illustrates the display of a camera icon selected in a second embodiment of the invention.

FIG. 17 illustrates the manner in which a selected camera icon is displayed. In the first embodiment described above, the manner in which the camera icon is displayed changes depending upon the mode. In the second embodiment, however, the modes are eliminated and panning angle, tilt angle, zoom magnification and focal point are controlled based upon the state of the display illustrated. In the description that follows, point C in FIG. 17 is the center position of the camera, point M is the focal point, line segments Q and Q' are referred to as "zoom lines" and a line segment P is referred to as a "tilt line".

If the event that has occurred is dragging of the focal point M ("YES" at step S38), then steps S39~S43 are executed. FIG. 10 is a diagram useful in describing a control method for changing panning angle and focal point. Point C represents the center of rotation of a camera when the panning angle of the camera is changed, and point M indicates a pointer position designated by the mouse. With regard to the panning angle, the orientation of the camera is obtained from the vector C→M (step S39) by calculation exactly the same as that described above with reference to FIGS. 3 and 4. In a case where the allowable panning range is exceeded, the value is replaced by the allowable limit in the same manner as that described earlier. Focal length is calculated from the scale of the map data and the lens parameters (step S40) in such a manner that the position of point M becomes the position of the focal point. If the camera orientation and focal-point position have been obtained, then the camera icon is repainted on the screen in such a manner that the camera orientation after panning will be understood, and the line segment between the point M representing the position of the focal point and the point C is painted to indicate that the point M is the position of the focal point and that the orientation of the camera is the direction of C→M (steps S41, S42). A pan instruction and an instruction to move the position of the focal point are sent to the camera 10 under control (actually to its camera controller 12), whereby camera is pointed in the designated direction and has its focal-point position changed to the designated position (S43). In order to indicate the orientation of the camera by the camera icon, it will suffice to additionally provide the icon with a portion indicating the direction of the lens and to display the camera icon in such an orientation that the lens portion thereof will point in the designated direction.

Figure 11:
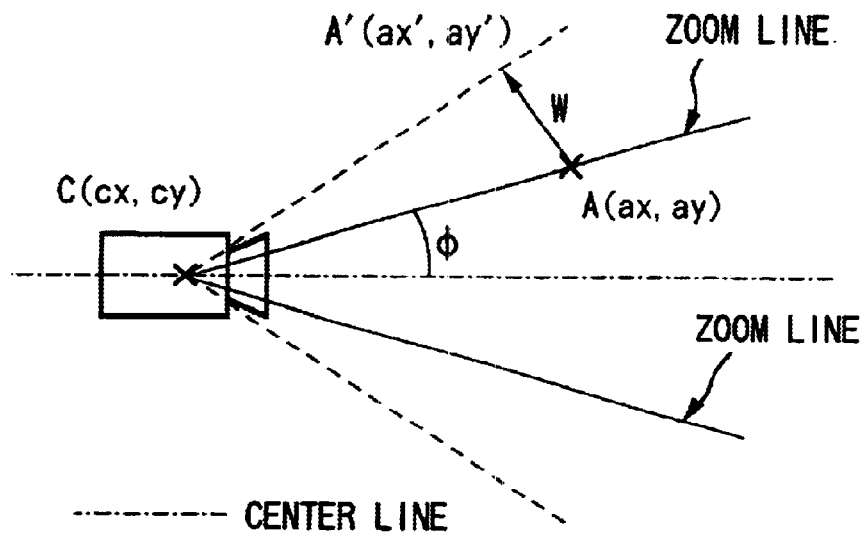
FIG. 11 is a diagram useful in describing an operation for changing zoom magnification in wide-angle direction.
Figure 12:
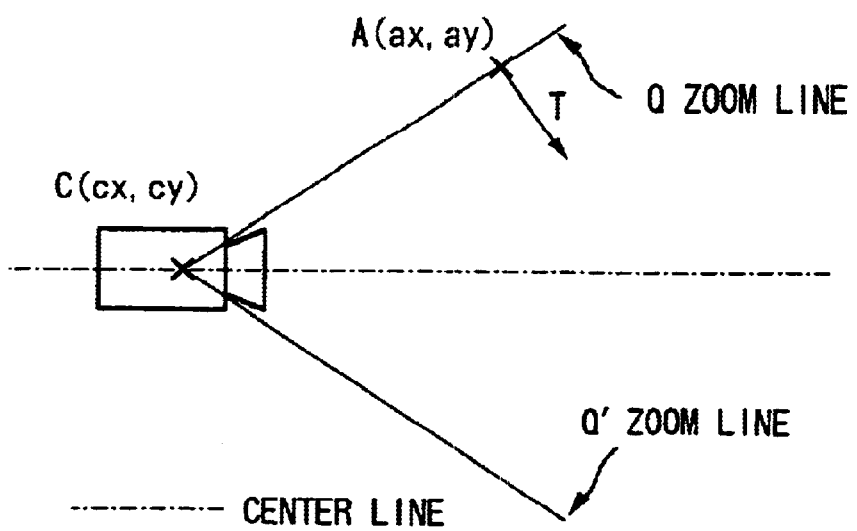
FIG. 12 is a diagram useful in describing an operation for changing zoom magnification in a telephoto direction.

In a case where the event that has occurred is dragging of zoom line Q or Q' ("YES" at step S44), then steps S45 and S46 are executed. FIGS. 11 and 12 are diagrams useful in describing an operation for changing zoom magnification. FIG. 11 illustrates a zoom operation for zooming to a wider angle, and FIG. 12 illustrates a zoom operation for zooming to a telephoto magnification. A change of zoom magnification can be designated by dragging, inward or outward, the zoom lines which define the current field of view. In case of zooming to a wide angle, for example, the user moves the mouse cursor outward (in the W direction) while pressing the mouse button starting from an appropriate point A on the zoom line indicated by the solid line. When the angle has been widened to a desired angle (point A' in FIG. 11), the user releases the mouse button. The CPU 22 paints a ray, which starts at point C and passes through point A', as a new zoom line. Similarly, the CPU 22 paints a similar ray having linear symmetry with respect to the center line. Zoom magnification is calculated (step S45) in such a manner that the angle φ defined by the center line and the zoom line will correspond to the horizontal distance of the photographic field of view of the camera 10 under control. The zoom magnification obtained by this calculation is applied via the camera input selector 32 to the camera controller 12 belonging to this controlled camera 10 (S46).

Similarly, when an appropriate point A on a zoom line is dragged inward (in the T direction), the zoom magnification is changed in the telephoto direction, as shown in FIG. 12.

In a case where the event that has occurred is dragging of the tilt line P ("YES" at step S47), then steps S45 and S46 are executed. FIG. 13 shows two examples of operations for changing tilt angle. Tilt can be controlled on the map (i.e. in a horizontal plane) as well. In this embodiment the tilt line is displayed between the zoom lines on either side as a line segment perpendicular to the center line (the optic axis for photography). More specifically, an isosceles triangle is constructed by the two zoom lines, the starting point of which is the point C, and the line segment perpendicular to the center line. The base P of this isosceles triangle is adopted as the tilt line. When any point (point A, for example) on the tilt line is dragged toward the camera icon or away from the camera icon, the tilt angle changes. If point A is moved in the F direction in FIG. 13 according to this embodiment, the tilt angle is changed to tilt the camera upward. If point A is moved in the f direction, the tilt angle is changed to tilt the camera downward. With L representing the distance between points C and A, the tilt angle φ can be obtained in accordance with $$\phi = \arctan[(L-a)/b]$$

at step S48, where a and b are constants. In particular, a represents the position of the tilt line at a branch point where the tilt angle is such that the camera points up or down from the center line. In a case where the angle φ obtained from the above equation falls outside the allowable limits of the tilt angle, it is replaced by the limiting value just as in the case of the panning angle. When the tilt angle φ obtained by this calculation is applied to the camera 10 under control (actually the camera controller 12 of this camera), the camera is tilted by the angle φ (S49). According to this embodiment, the interior of the isosceles triangle formed by the two zoom lines and tilt line is displayed in a different color. As a result, the tilt angle is displayed in a manner that makes it easy to comprehend.

In accordance with this arrangement, the user is capable of intuitively comprehending whether camera control is control to change panning, tilting, zooming or focal point.

Third Embodiment

An example in which operation in accordance with the embodiment shown in FIG. 1 is simplified will now be described as a third embodiment.

In a case where an operated camera 10 has an auto focus function, the need to remotely control focusing diminishes greatly. In a case where the subject of photography falls within the upper and lower limits of the field of view, there is less need to perform the tilting operation as well. Accordingly, if these operations can be deleted from the operations performed using the map, operation will be simplified and easier to understand.

Figure 14A:
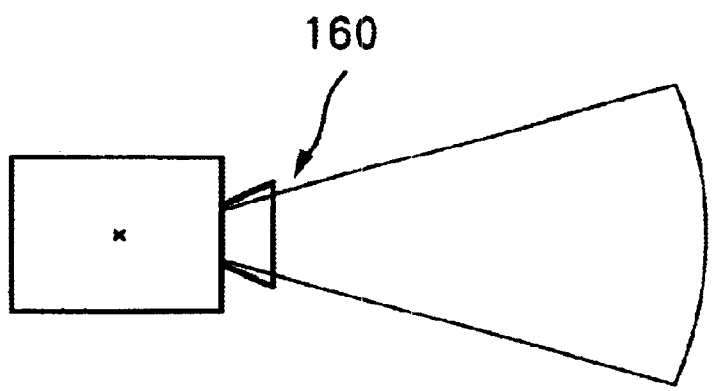
FIG. 14A illustrates an example of a camera icon in yet another control method.
Figure 14B:
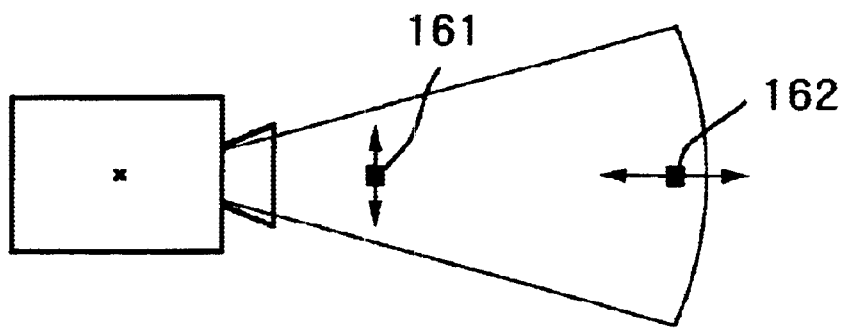
FIG. 14B illustrates control points in this control method.

Operability is improved further by displaying a sector shape, which indicates the limits of the field of view, as a part of the camera icon in the manner shown in FIG. 14A. If a camera corresponding to a camera icon 160 shown in FIG. 14A is selected, control points appear within the sector shape, as illustrated in FIG. 14B. Point 161 is a control point for performing the panning operation when dragging is carried out by a pointing device such as the mouse 30. Point 162 is a control point for performing the zooming operation a dragging operation carried out in a similar manner. These control points have bidirectional arrow marks for the circumferential and radial directions so as to indicate panning/zooming. Since the methods of calculating the panning and zooming values from the coordinates of the respective dragging endpoints are similar to those set forth in the earlier examples, no further explanation is required. In this embodiment, the length (radius) of the sector shape does not have any particular meaning and is made to correspond to maximum/minimum zoom values so as to make the zooming operation easier to understand. The length adopted may be one obtained by multiplication by a coefficient so long as the resulting sector shape does not interfere with other objects displayed on the map.

Fourth Embodiment

The characterized features of a fourth embodiment of the invention will now be described.

In a case where an area of interest displayed on a single map is large, a case where the display screen (display area) is small or a case where the size of the map window 40 is limited so as not to interfere with other windows, it is difficult to display the entirety of a map at the same time and difficult to grasp the overall layout and the relationship among the deployed cameras.

Figure 15:
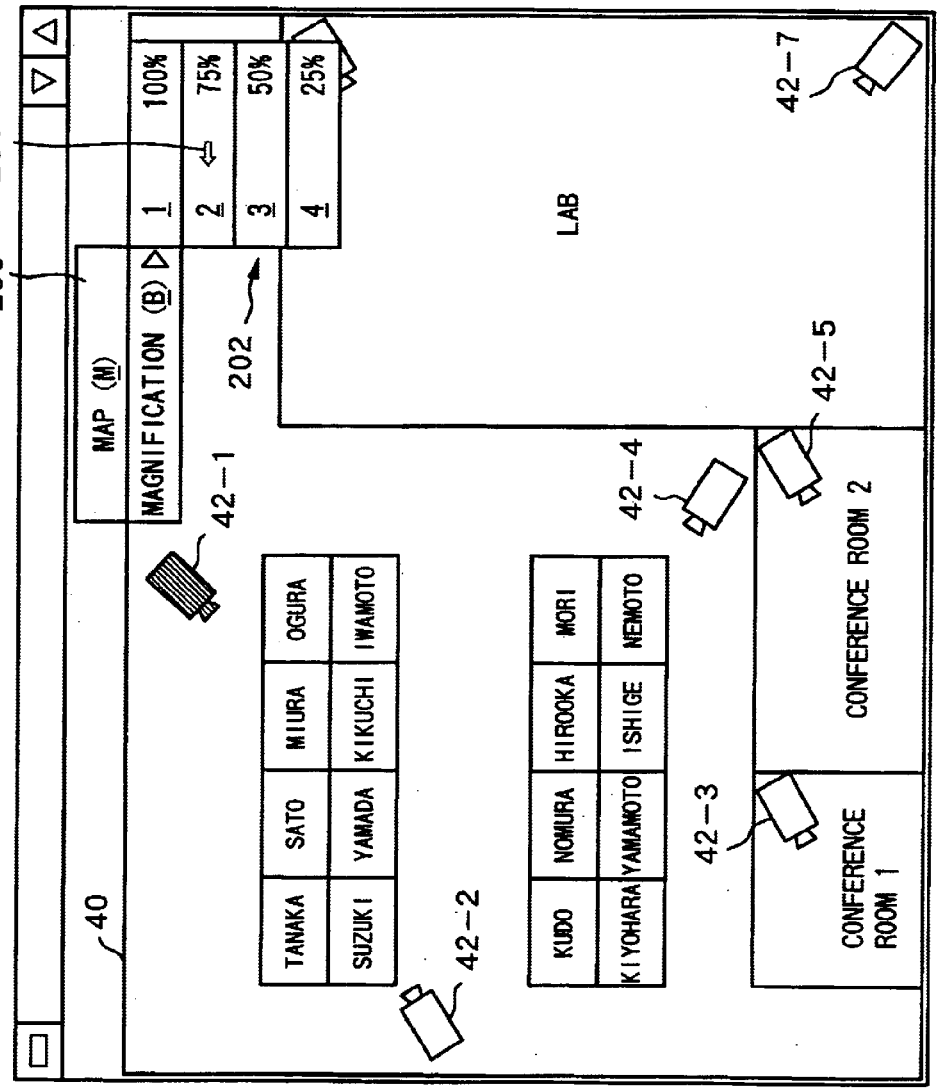
FIG. 15 illustrates a map window that makes it possible to change display magnification.
Figure 16:
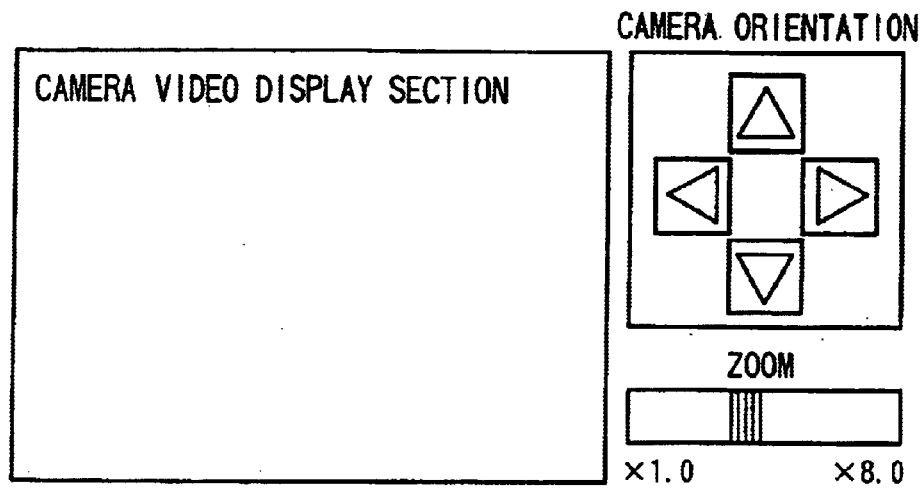
FIG. 16 illustrates an example of a control screen according to the prior art.

This difficulty can be avoided by arranging it so that the display magnification of the map window 40 shown in FIG. 2 can be varied. FIG. 15 illustrates such an example, in which a menu bar 200 is provided at the exterior of the map window 40 shown in FIG. 2 and has a pull-down menu 202 by which the magnification is designated. In this example, the magnifications that can be selected are 100%, 75%, 50% and 25%. To make the selection, a cursor 204 is moved to the desired magnification (75% in the illustrated example) by operating the mouse 30 and the desired magnification is then designated by the mouse. More specifically, the user clicks on the menu bar (map) 200, drags the cursor 204 to the "Magnification" item displayed in the menu at this time, moves the cursor 204 to "75%" in the pull-down menu 202 displayed by designating the "Magnification" and then releases the mouse button to end the dragging operation. Concurrently, the map data are computed by the CPU 22 in such a manner that the map being displayed will be re-displayed at the selected magnification as the map window 40. It is also possible to display a substitute map based upon information stored beforehand in the secondary memory 26 at the appropriate magnification. In this embodiment constructed as described above, the mouse 30 functions as designating means and the CPU 22, the processing software (program) and, in addition, the pull-down menu 202, function as control means and display magnification changing means.

Figure 18:
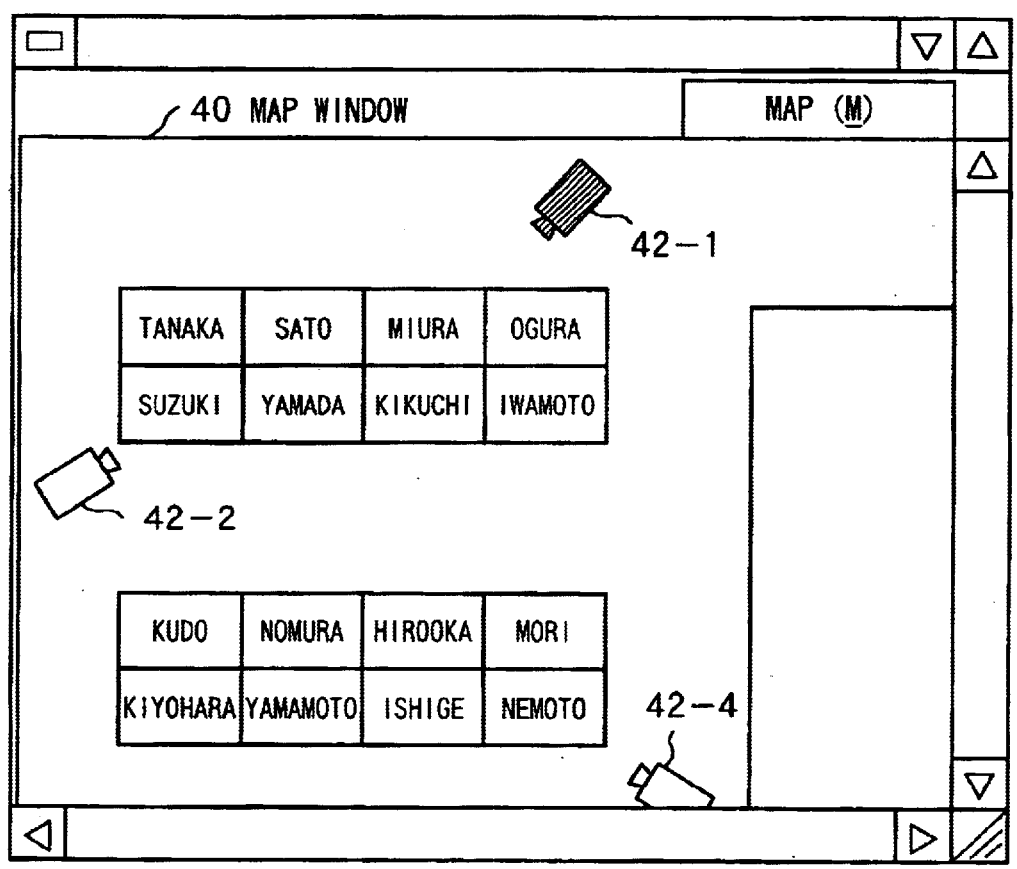
FIG. 18 illustrates a display presented when the map window is reduced in size.
Figure 19:
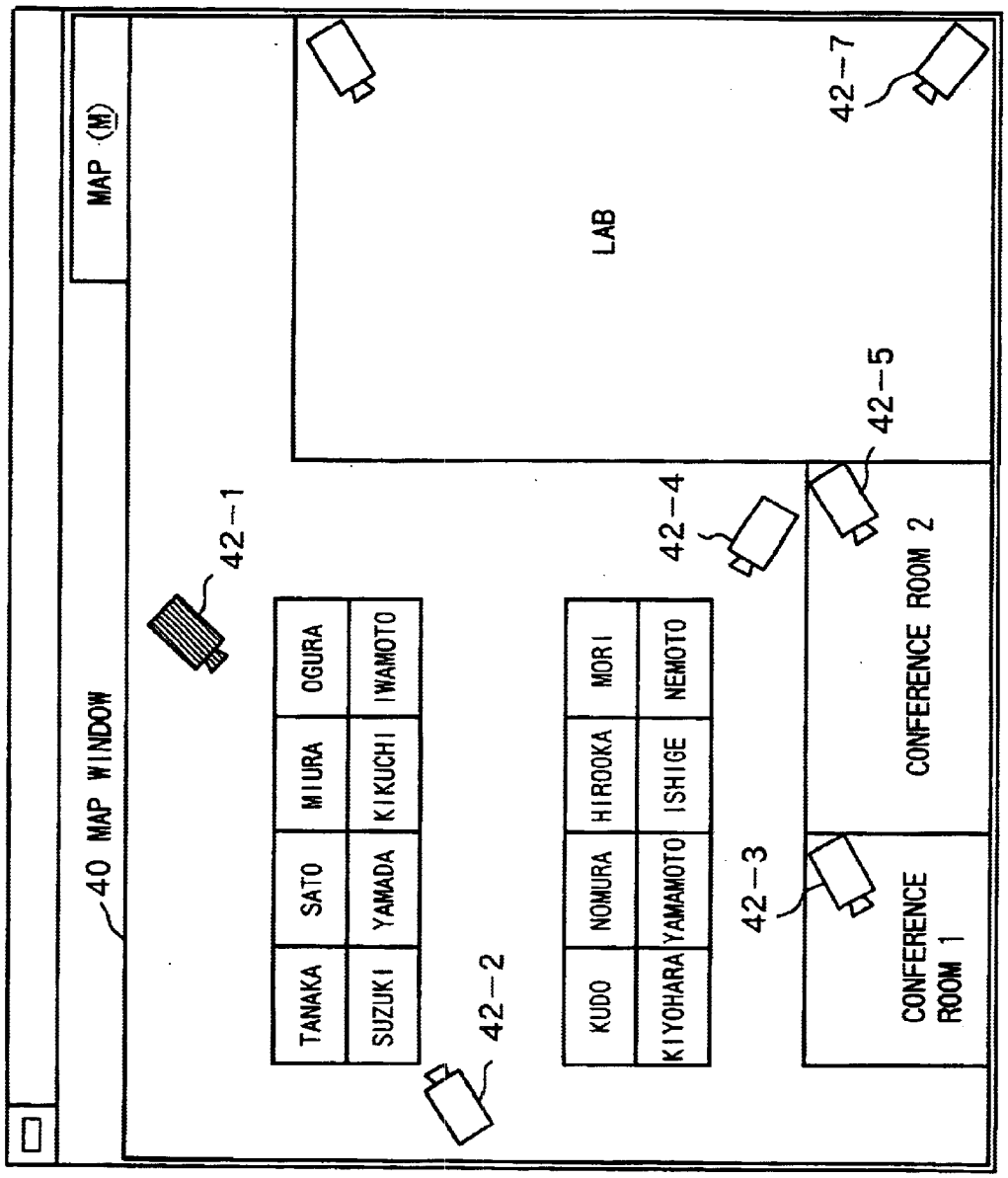
FIG. 19 is a diagram showing the display of the map window presented when display magnification is changed.

A specific example of a reason for making it possible to vary map display magnification in the manner set forth above will be described with reference to FIGS. 18 and 19.

In a case where three windows are displayed in the manner shown in FIG. 2, there will be enough space to display each of the windows if the logical space of the display device is large. If the logical space is small, however, the video window 44 and the map window 40 may overlap each other, thus possibly giving rise to a situation in which operation is difficult to perform. Further, if another application is running, the window that corresponds to this application also will be displayed. This means that the problem mentioned above cannot be ignored.

Accordingly, in the third embodiment, when the map window of the kind shown in FIG. 15 is being displayed, assume that the lower right corner of the map window 40 is dragged to reduce the size of the map window 40. The result is shown in FIG. 18, in which it will be seen that the entire map cannot be comprehended and that there are cameras which can no longer be displayed. Accordingly, by setting the display magnification in FIG. 15 to, say, 75%, a map window 40 of the kind shown in FIG. 19 can be obtained.

It is necessary that the camera icons 42-1~42-7 be displayed at the correct positions on a map that has been enlarged or reduced in size, and the size of the camera icons per se must be changed in stepwise fashion, even if not continuously, in such a manner that these icons will not interfere with the display. Of course, in order to perform a more precise operation, it is possible to display the map in enlarged form. When the map is enlarged or reduced in size, however, there are instances where camera operation described above is impeded, as will be described below.

In the initial example of operation described in the embodiments (the operation according to the first embodiment), the zoom value and tilt angle are calculated from a difference in a specific distance L. Though panning and focusing operations are not impeded, the distance L, which serves as a reference, changes in the map window 40 when the magnification is changed. This inconvenient in terms of the zooming and tilting operations. Accordingly, it is so arranged that only the panning operation is allowed in a case where the reduction ratio is made 50% or less.

Figure 20:
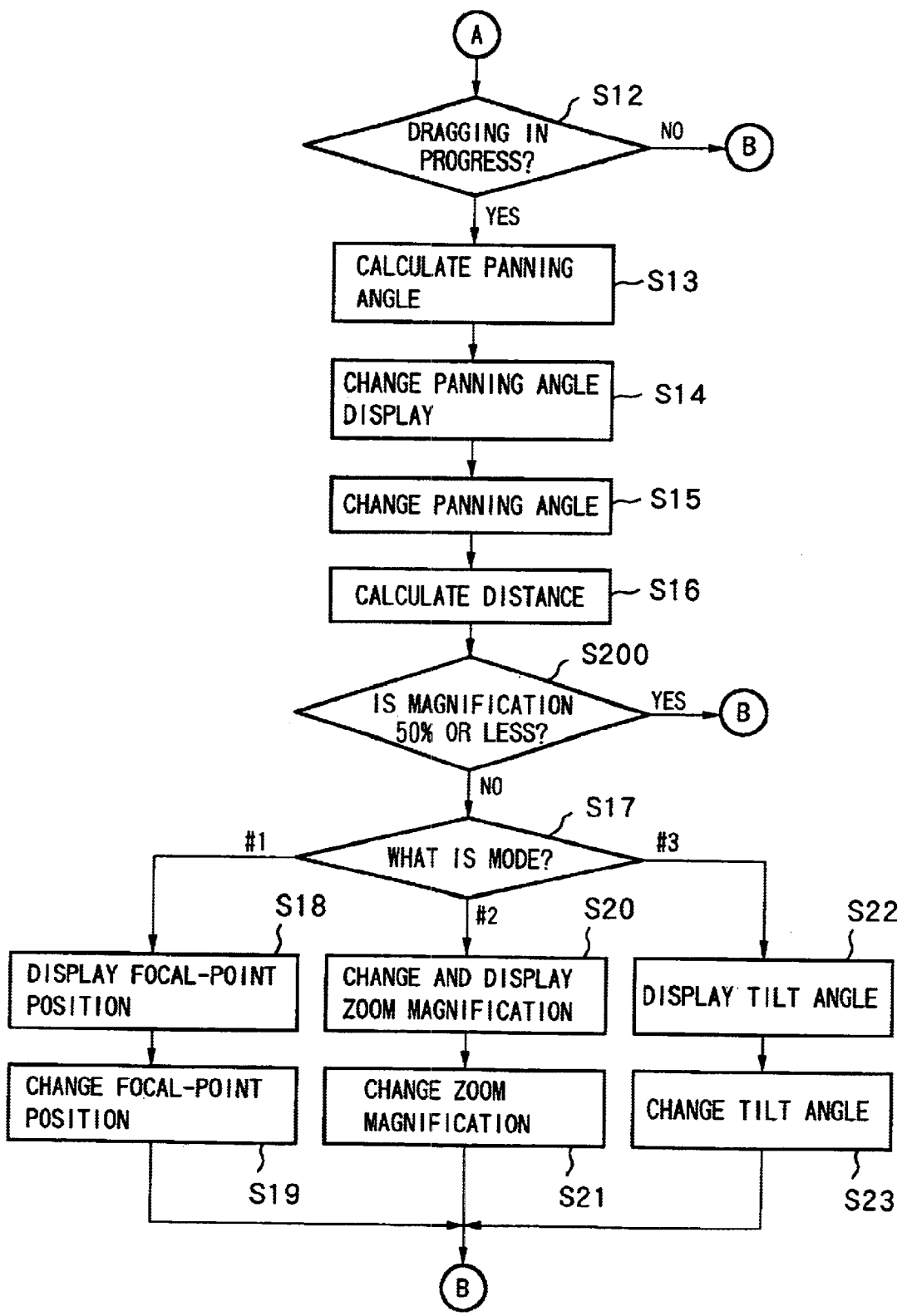
FIG. 20 illustrates an example of a modification of the flowchart of FIG. 4 according to a fourth embodiment of the invention.

By way of example, in order to perform solely the panning operation effectively when the rate of reduction is 50% or less in the first embodiment, it will suffice to execute processing in accordance with the flowchart of FIG. 20 instead of the flowchart of FIG. 4.

The flowchart of FIG. 20 differs from that of FIG. 4 in that a step S200 is provided after step S16. If it is found at step S200 that the zoommagnification is 50% or less, then processing from step S17 onward is no longer executed; only the panning operation of steps S13~S16 is carried out.

Further, in the example of operation according to the second embodiment, there is comparatively little influence upon the dragging of the zoom lines. However, the display of the tilt line becomes too small when size is reduced, thus detracting from operability. In the case of this example, it is so arranged that only the panning and zooming operations are allowed if the reduction ratio is made 50% or less.

In the example of operation according to the third embodiment as well, the camera icons and the sector shapes indicating the limits of visual field are reduced in size when the map is reduced in size and a larger map area is displayed. The panning and zooming control points are difficult to move accurately if the reduction ratio is high. In this example, control is performed by the CPU 22 so as to limit operation. Specifically, operation performed on the map window 40 is limited solely to selection of the cameras and the sector shapes merely display the visual field if the reduction ratio is made 25%. However, in a case where the operation according to the third embodiment is carried out, it is possible to avoid the above-mentioned difficulty by making only the sector shape of the camera currently under control the same size as usual.

Though various examples of operation have been described above, a display of video (images) is presented in each example of operation.

Further, in each example, a case in which reduction is performed is described in the main. However, it is difficult to perform the panning operation while maintaining focus into an area outside the display limits in a case where the map has been enlarged and, in operation according to the second embodiment, operability suffers in a case where display of the tilt line increases in size when the map is enlarged.

The extent to which the limits on enlargement and reduction, which in turn place a limitation upon operation, may be set can be made a constant in a case where the configuration of the equipment is fixed. (In the embodiments, the limit on reduction is a reduction ratio of 25%, as mentioned above.) However, since there are a plurality of inter-related factors, such as the size and resolution of the display, the resolution of mouse tracking and the sense of the operator, it is not always possible to effect a setting to a single, fixed value. Effecting a setting to a value that conforms to the environment of one's own equipment using as a reference a value that has been set for the environment of specific equipment, after calculating a difference from (or applying a magnification to) this value, is realistic processing. In other words, arranging it so that enlargement and reduction ratios can be set in variable fashion also is a useful expedient. This is carried out by having the CPU 22 execute the above-described processing.

Further, in a case where an operation is performed outside the display limits, it is possible to detect this state and refrain from performing only this operation.

Though various embodiments have been described, it is also possible to adopt an arrangement in which, when camera selection is performed by clicking the mouse in the map window, the camera nearest to the clicked position is selected from among the plurality of cameras in the map window and a transition to the operation for dragging the focal-point position can be made in prompt fashion. If this arrangement is adopted, the nearest camera on the map is pointed toward the point clicked by the mouse and, at the same time, the focal-point position is controlled in such a manner that focusing at the clicked position is achieved. In other words, since camera selection and panning can be controlled at the same time, it is possible for the camera nearest to the point of interest to be pointed toward the point of interest promptly.

It goes without saying that the foregoing embodiments can be combined or utilized together selectively.

Further, the present invention can be applied by supplying a system or apparatus with a program. In such case a storage medium storing a program according to the invention constitutes the invention. By reading the program from the storage medium to the system or apparatus, the system or apparatus will operation in the predetermined manner.

It will readily be understood from the foregoing description that, in accordance with the present invention, camera layout and the locations of the camera are displayed as images in the form of a map and camera icons. This makes it possible to provide a user interface that can be readily understood intuitively. Further, operability when selecting and operating any one camera from among a plurality thereof is greatly improved.

Furthermore, according to the invention, means for changing display magnification is provided. As a result, it is possible to display the entirety of the map simultaneously and comprehend the full map even if the area of interest displayed on a single map is large, the display screen is small or the size of the map window 40 is limited so as not to interfere with other windows.

Further, when magnification is less than a predetermined value, functions capable of being controlled are limited. This makes it possible to prevent a hindrance to camera operation.

As many apparently widely different embodiments of the present invention can be made without departing from the spirit and scope thereof, it is to be understood that the invention is not limited to the specific embodiments thereof except as defined in the appended claims.

What is claimed is:

1. A camera operating system for making it possible to operate a camera having an operational function, comprising:
    display device arranged to display a map in area of a screen and to display a control part for controlling the camera in the area; and
    operating device arranged to operate the operational function of the camera by designating the control part;
    wherein said operating device limits the operation of the operational function of the camera in accordance with changing magnification of the displayed map with respect to the same size of the area.

2. The system according to claim 1, wherein the camera has a plurality of operational functions, and when the display magnification of the displayed map is less than a predetermined magnification, said operating device prohibits the operation of the operational functions of the camera.

3. The system according to claim 2, wherein the predetermined magnification is made 25%.

4. The system according to claim 2, wherein when a display magnification of the displayed map exceeds the predetermined magnification, said operating device permits operating at least one of a panning operation and zooming operation of the camera.

5. The system according to claim 4, wherein the predetermined magnification is made 25%.

6. The system according to claim 1, wherein a display magnification of the displayed map is capable of being set in variable fashion.

7. A camera operating method for controlling a camera having an operational function, comprising:
    a display step of displaying a map, on which the camera is present, in an area of a screen and a control part for controlling the camera in the area; and
    an operating step of operating the operational function of the camera by designating the control part;
    wherein said operating step limits the operation of the operational function of the camera in accordance with changing magnification of the displayed map with respect to the same size of the area.

8. A storage medium storing program codes for operating a camera having an operational function, by being read in and executed by a computer, comprising:
    a program code of a display step of displaying a map, on which the camera is present, in an area of a screen and a control part for controlling the camera in the area; and
    a program code of an operating step of operating the operational function of the camera by designated the control part;
    wherein said operating step limits the operation of the operational function of the camera in accordance with changing magnification of the displayed map with respect to the same size of the area.

9. A operating system to operate an electronic apparatus having an operational function, comprising:
    display device arranged to display a map and a control part for controlling the apparatus in a size of an area of a screen; and
    operating device arranged to operate the operational function of the apparatus in response to designating the control part;
    wherein said operating device restricts the operation of the operational function of the apparatus in accordance with changing the magnification of the displayed map with respect to the same size of the area.

10. The system according to claim 9, wherein the apparatus has a plurality of operational functions, and when the display magnification of the displayed map is less than a predetermined magnification, said operating device limits the operation of at least one of the plurality of operational functions of the apparatus.

11. The system according to claim 10, wherein the predetermined magnification is 25%.

12. The system according to claim 9, wherein a display magnification of the displayed map is capable of being set in variable fashion.

13. A method for operating an electronic apparatus having an operational function, comprising:

a display step of displaying a map and a control part for controlling the apparatus, in an area of a screen; and an operating step of operating the operational function of the apparatus by designating the control part;

wherein said operating step limits operation of the operational function of the apparatus in accordance with changing magnification of the displayed map with respect to the same size of the area.

14. A storage medium storing program codes for operating an electronic apparatus having an operational function, comprising:

a program code of a display step of displaying a map and a control part for controlling the apparatus in an area of a screen; and a program code of an operating step of operating the operational function of the apparatus by designating the control part;

wherein said operating step limits the operation of the operational function of the apparatus in accordance with changing magnification of displayed map with respect to the same size of the area.

15. The system according to claim 1, wherein said display device changes a size of the displayed control part in accordance with the magnification of the displayed map.

16. The system according to claim 7, wherein said display step changes a size of the displayed control part in accordance with the magnification of the displayed map.

17. The storage medium according to claim 8, wherein said display step changes a size of the displayed control part in accordance with the magnification of the displayed map.

18. The system according to claim 9, wherein said display device changes a size of the displayed control part in accordance with the magnification of the displayed map.

19. The system according to claim 13, wherein said display step changes a size of the displayed control part in accordance with the magnification of the displayed map.

20. The system according to claim 14, wherein said display step changes a size of the displayed control part in accordance with the magnification of the displayed map.

* * * * *